United States Patent Office
3,384,568
Patented May 21, 1968

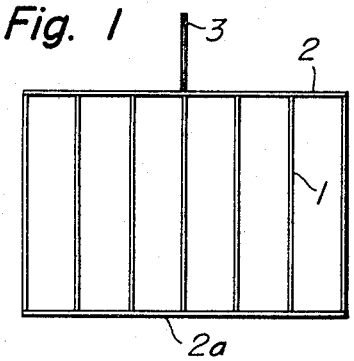
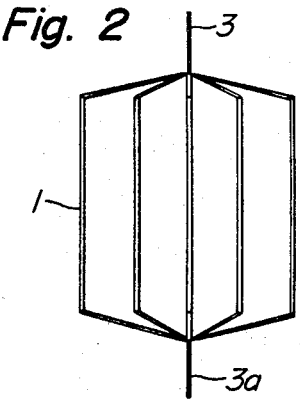
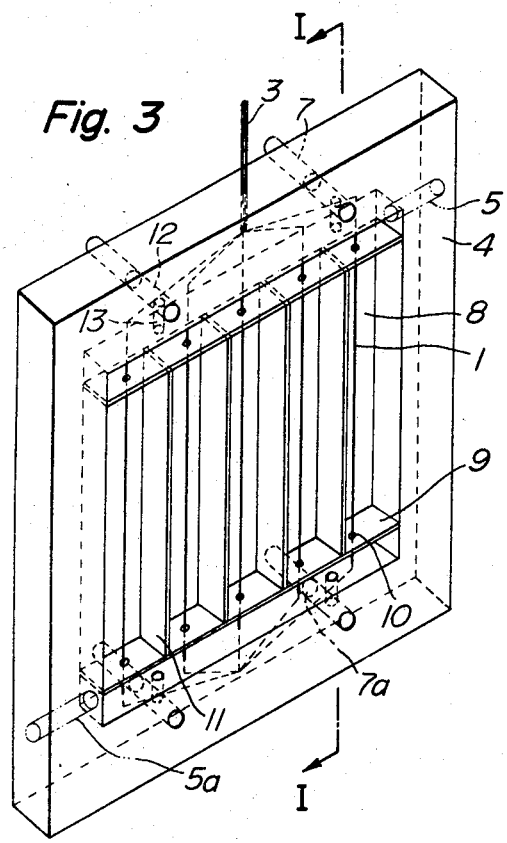
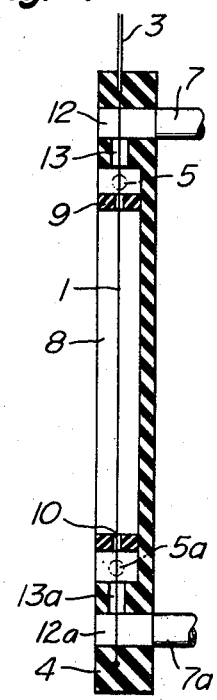

3,384,568
ELECTRODIALYSIS APPARATUS HAVING
CHORD ELECTRODES
Masaaki Kato, Yokohama, Ryozo Komori, Tokyo, and
Mitsunobu Fukumoto, Yokohama, Japan, assignors to
Asahi Kasei Kogyo Kabushiki Kaisha, Osaka, Japan, a
corporation of Japan
Filed Nov. 19, 1963, Ser. No. 324,744
Claims priority, application Japan, Nov. 22, 1962,
37/51,095; Mar. 12, 1963, 38/11,390
9 Claims. (Cl. 204—301)

ABSTRACT OF THE DISCLOSURE

A multicell electrodialyzer which comprises a plurality of dilution compartments and concentration compartments sectioned with anion permselective resin membranes and cation permselective resin membranes alternately, and electrodes at the outermost ends of the apparatus. The electrodes each consist of a plurality of cords made of electroconductive material which prevents accumulation of insoluble precipitate on the electrode surfaces or in the electrode compartment.

---

This invention relates to improvements in apparatus used for the electrodialysis of aqueous solutions containing inorganic or organic salts which are to be removed therefrom.

More particularly, this invention relates to apparatus having cordlike electrodes therein and has an object to prevent or overcome the accumulation of insoluble precipitates on the surfaces of electrodes since such accumulation causes the clogging of solution-flow inside the electrodes and the electrode compartments and consequently decrease the available current density.

During the electrodialysis of aqueous solutions effected in multi-cell electrodialysis apparatus having alternating dilution and concentration compartments defined by spaced alternating anion and cation permselective resin membranes, the electrodialysis heretofore often interrupted to remove the accumulation of the insoluble precipitate on the surfaces of electrodes and in the electrode compartments, or the addition of some chemicals was necessary for the purpose as mentioned above. The apparatus of the present invention enables the continuous electrodialysis at a good efficiency by providing cordlike electrodes composed of a plurality of cords made of electroconductive material arranged in parallel or non-parallel at regular or irregular intervals.

A primary object of this invention is to provide electrodialysis apparatus having electrodes which do not cause accumulation of insoluble precipitate on their surfaces nor inside the electrode compartments when the electrode solution contains solution components capable of forming insoluble precipitates in the electrode compartments and on the electrode surfaces by reacting with alkalis or acids resulting from electrode reaction during the passage of direct current through the apparatus. Another object of the invention is to provide an electrodialysis apparatus which is very simple to handle, is simple to manufacture and is, at the same time, low in price and inexpensive.

Figure 5:
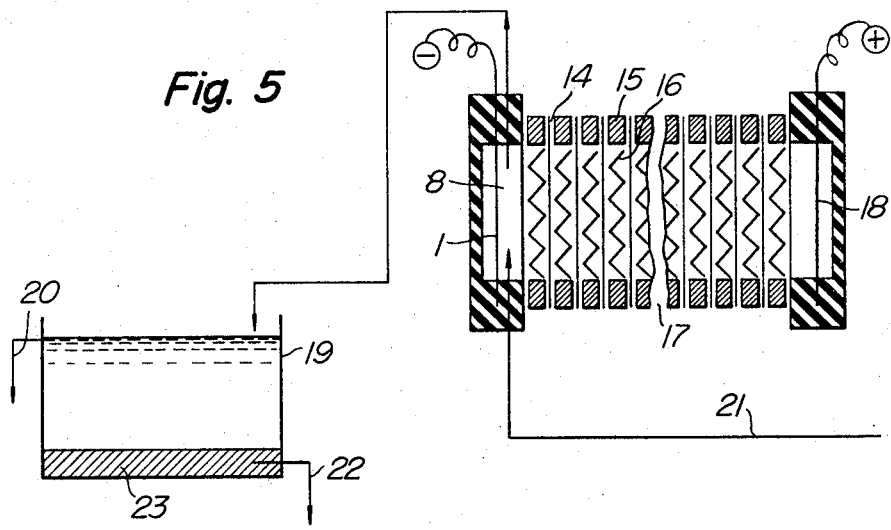

Other objects, features and advantages of the invention will be apparent from the following detailed description when read with the drawings wherein:

FIG. 1 and FIG. 2 are front views showing two embodiments of cord electrodes according to the present invention; FIG. 3 is a perspective view showing one embodiment of an electrode compartment equipped with a cord electrode according to the present invention; FIG. 4 is a vertical-sectional view taken along the I—I line in FIG. 3; FIG. 5 is a schematic diagram illustrating one example of electrodialysis apparatus and piping for removing precipitate produced inside the cathode compartment when a cord electrode comprises the cathode of the apparatus.

Figure 6:
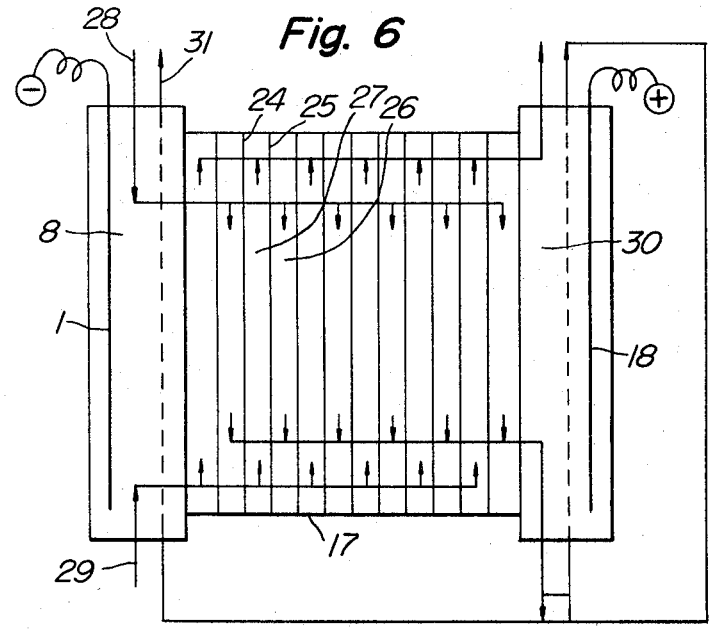

FIG. 6 is a schematic diagram illustrating a system of inlet and outlet solution flow through a membrane stack and the re-circulating of the concentration stream through the electrode compartments; and FIGS. 7 to 10 are generally piping schematics for electrode rinse solution when at least one electrode is employed in an electrodialysis apparatus according to the invention.

Heretofore electrodes of electroconductive material in the form of planes, grates or cylinders have been employed in electrodialysis apparatus using ion-exchange resin membranes. However, when such electrodes were used as cathodes in the presence of solution containing ions such as $Ca^{++}$, $Mg^{++}$, $HCO_3^-$ and $SO_4^{--}$, precipitates such as magnesium hydroxide, calcium sulfate, calcium carbonate etc. formed on the surface of the cathodes and in the cathode compartment due to the usual electrode reaction and accumulated on the cathode surface and in the cathode compartment causing the clogging of the flow of solution in the cathode compartments and the decrease in current density by the accumulation of the precipitates. Generally such accumulation of precipitate cannot be prevented from occuring by merely intermittently increasing the rate of solution flow into the electrode compartments. Thus continuous and safe electrodialysis over a long period was heretofore often interrupted unless an acid was added to the cathode rinse solution. In the same manner, when the heretofore known electrodes were used as anodes and a solution containing compounds such as sodium stearate were used as the anode rinse solution in the absence of free alkalis insoluble free organic stearic acid accumulated on the anode surface or in the anode compartments causing the same as mentioned above. In order to prevent the accumulation of the precipitates in the examples stated above, acid had to be added in the cathode rinse solution or into the cathode compartment, and alkali in the anode rinse solution of anode compartment respectively for conducting electrodialysis successfully. In most cases of electrodialysis processes using ion exchange resin membranes, such procedures as described above have made it impossible to supply the inlet or outlet solution of concentration or dilution stream directly into the electrode compartment. As in most cases of electrodialysis processes using ion exchange resin membrane, the acid and alkali had to be added in the electrode rinse solution as stated above, it was impossible to supply the concentration stream or the dilution inlet or outlet solution of the stream. In order to solve the above mentioned problems and not complicate the apparatus, a new type of electrode is provided according to the invention i.e., a cord electrode. With a cord electrode according to the invention, accumulation of precipitates is completely prevented and accordingly there is no need for adding acid or alkali in the electrode rinse solution. Therefore, a very great advantage is obtained.

More particularly, with a cord electrode, the electrode solution flows uniformly along thin cords made of electroconductive material to keep the washing effect on the electrode excellent. Further, with the present invention, the generation of the gas at the surfaces of the cords during the course of electrodialysis occurs uniformly along the thin cords. Therefore, as the precipitates are produced on the electrodes by the usual electrode reaction when the electrode rinse solution is supplied continuously to the electrode compartments, the precipitates are easily liberated from the cord electrodes as small flocks by the excellent washing effect and the gas generation and they are removed from the electrode compartment along with the rinse solution. Accordingly, no accumulation of precipitates occurs on the electrodes or in the electrode compartments. Therefore, continuous and steady operation is possible. These advantages occur only because of the use of the cord electrodes of the present invention. During electrodialysis using the electrodes of the present invention particles of the precipitates liberated from the cords are small in size and accordingly do not cause any restriction in the flow of electrode rinse solution since they do not adhere to nor accumulate in the electrode compartments or attached piping. By this action of preventing accumulation, it is unnecessary to add acid into the cathode compartment and alkali into the anode compartment as has been hitherto necessary to prevent formation of precipitate in the case of electrode rinse solutions containing scale-forming components. Accordingly, the omission of pumps, piping, tank and auxiliary equipment or other means for supplying acids and alkalis has made the operation and apparatus remarkably simple. Further, by employing cord electrodes in electrodialysis apparatus having alternating dilution and concentration compartments with spaced anion and cation permeselective resin membranes therebetween, concentration streams and dilution streams which passed through the membrane stacks can directly be supplied to the electrode compartments as the electrode rinse stream. Accordingly, there is a more economical use of water and the elimination of the usually required parts such as piping, pumps, tanks etc. for supplying electrode rinse solution separately. There is thus provided a simplified apparatus for performing economical electrodialysis which is easy to handle and operate. Besides, by taking advantage of the fact that the precipitates are liberated without adhesion and accumulation and are continuously removed from the compartments by flotation in the electrode rinse solution, when sea water is supplied to cathode compartments in electrolysis apparatus in which the cord electrodes of the present invention are employed as the cathode, the precipitate of $Mg(OH)_2$ is formed on the cathode and as soon as it grows slightly it can be liberated from the cord and discharged from the compartment with the catholyte, and after being brought to a settling tank or reservoir, the precipitate of $Mg(OH)_2$ is removed for use as a raw material for metallic magnesium and magnesia clinker.

Referring now to FIG. 1, there is shown a plurality of cords 1 made of electroconductive material mechanically and electrically connected at their upper and lower ends to connecting rod 2 made of electroconductive material. An electrode plug 3 is connected to the connecting rod 2. The diameter of the cord 1 is preferably under 5 mm. With cords having diameters greater than 5 mm. the liberation effect of precipitates is lowered. The connecting rods are provided for the purpose of insuring the mechanical rigidity of the electrode structure for passing electric current from an external current source to the electrodes by means of the electrode plug.

The liberation effect is especially effective when the shortest distance between the mutually adjacent cords 1 (the intervals between the two cords) is 0.5–50 mm. When the distance is less than 0.5 mm., a mutual contact of the cords 1 can easily occur, lowering the liberation effect of precipitates. On the other hand, when the separation is greater than 50 mm., current density concentrates locally, producing unfavorable electrodialysis. Furthermore the apparatus becomes large, a disadvantage from the economic point of view.

The materials used for the cords 1 are metals such as lead, iron, platinum, titanium, aluminum, copper and nickel and alloys such as lead-antimony, lead-silver, iron-silicon, stainless steel and titanium plated with platinum. However, among the materials mentioned above, those suitable for the anode and cathode are those which are insoluble in the particular use. The cross-sectional form of the cord 1 can be round, rectangular, elliptical or any other optional form. The cords can be arranged either in parallel or non-parallel and need not necessarily be straight but can be curved.

FIG. 2 is the front view showing another example of an electrode in accordance with the present invention, in which electrode plugs 3 and 3a are arranged at the upper and lower parts.

FIG. 3 shows an example of an electrode compartment in which a cord electrode is employed. Each of the cords 1 passes through the center of one of a plurality of small holes 10 in rectifier plates 9 which is of an insulating material and operates as a rectifier for solution-flow and a concentrator for the generation of gas around the cords. Between adjacent cords 1 there is a spacer 11 made of electric insulating material. The rectifying plate 9 and the spacer 11 are employed to carry out more effectively a uniform flow of the electrode rinse solution around the cord electrode to obtain a good washing effect on the cords 1. The cord electrode alone can operate completely without the rectifying plate 9, and the spacer 11, since the use of cords as electrode and the arrangement of a plurality of cords longitudinally cause a good washing effect around the cords and the even generation of gas. Accordingly, there is an easy liberation of the insoluble precipitate formed on the surfaces of cords and inside the electrode compartments. However, by combining the rectifying plates and spacers with the cords, economical electrodialysis is possible using a smaller quantity of electrode solutions.

In FIG. 3, two rectifying plates 9 are set at the upper and lower ends of the cord electrode. However, it is possible to arrange a plurality of rectifying plates 9 and spacers 10 at regular or irregular intervals so as to increase the velocity of a solution flow on the surface of each cord 1 and to concentrate the gas produced from the electrodes on the surface of the cord 1. Electrode rinse solution is conducted, through inlet pipes 7a or 7 made of electric insulating material to supply electrode rinse solution into the holes 12a or 12 passing through the frame 4 which are to be connected with the pipes 7a or 7, and through holes 13a or 13 to compartment 8 enclosing the space area around the cord 1. The rinse solution circulates around the cord 1 from bottom to top or from top to bottom, and then discharged through holes 13 or 13a, 12 or 12a and pipes 7 or 7a. This conduit system can be replaced by pipes 5 and 5a.

FIG. 4 is a vertical sectional view taken along the I—I line in FIG. 3 (the reference characters are the same as those in FIG. 3).

Several examples of electrodialysis apparatus using anion exchange resin membranes and cation exchange resin membranes to define dilution and concentration compartments therebetween and cord electrodes as cathode or anode thereof are hereinafter explained. It should be noted that the apparatus of the present invention characterized by cord electrodes therein as well as the construction of the stack has enabled the economical reuse of the feed solution without any complication of the apparatus or its operation as well as smooth electrodialysis over long periods. This was first realized by the good liberation-effect of the precipitate on the electrode as a result of electrode reaction. In this apparatus a part or all of outlet solution from concentration or dilution compartments or raw sea water and raw-brackish water from a separate source is conducted into both the cathode and anode compartments of one electrode compartment to the other in series or in parallel as the electrode rinse solutions.

In FIG. 5, the electrode 1 according to the present invention is placed as a cathode at the end of an electrodialysis-unit 17 comprising an ion exchange resin membrane 25, cation exchange resin membrane 24 gasket 15 and separator 16, and a suitable anode 18 such as a graphite electrode or a platinum electrode is placed at the other side end. A cathode rinse solution is supplied to area 8, the cathode compartment and electrodialysis is carried out by passing direct current between cathode 1 and anode 18. Precipitate, for example, $Mg(OH)_2$ which is produced in the cathode compartment flocks and is brought out of the compartment by the outlet stream of cathode rinse solution. The flock is precipitated in a suitable settling pool 19 and top solution flows off through overflow-pipe 20. Percipitate is drawn off via conduit 22.

When electrodialyzing a solution containing components such as sodium stearate which produce useful precipitate in the anode compartments, the cord electrode is used as the anode and the procedure as mentioned above can be carried out with the abovementioned metals as the cathode and extracting the anode solution containing precipitates.

FIG. 6 is a schematic sectional view showing one example of an electrodialysis apparatus of the present invention wherein the cord electrode is applied to cathode 1. In FIG. 6, as in FIG. 5, anion exchange resin membranes 25 and cation exchange resin membranes 24 are assembled in unit 17 defining concentration compartment 26 and dilution compartment 27. The concentration stream after passing each concentration compartment 26 is again conducted to the anode compartments 30 and then cathode compartment 8 in series.

Figure 7:
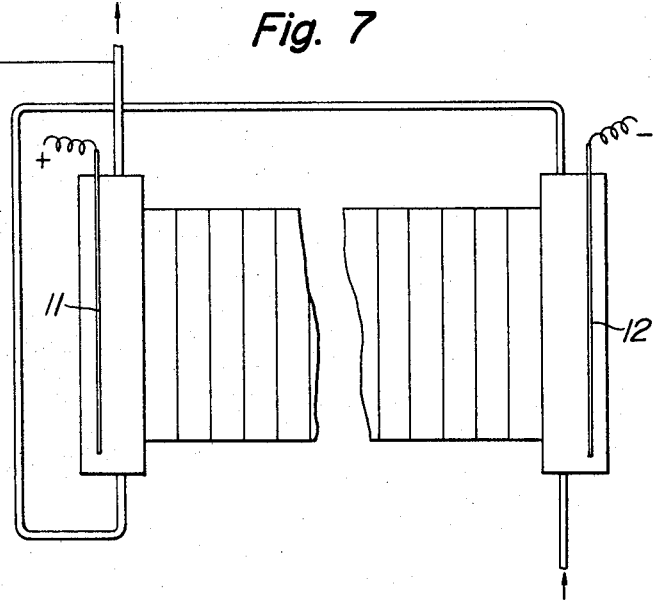
Figure 8:
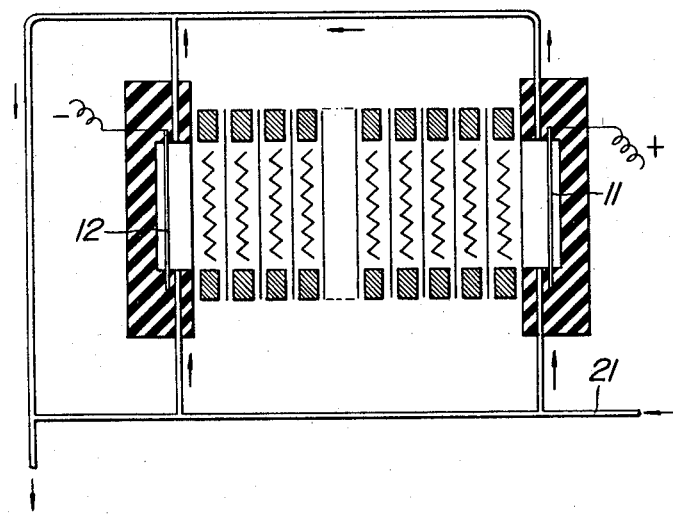

FIG. 7 and FIG. 8 show a flow of an electrode rinse solution which can be employed when electrodes such as are shown in FIG. 1 and FIG. 2 are used for the anodes and cathodes of an electrodialysis apparatus. FIG. 7 shows an example of passing an electrode solution in series from the cathode compartment to the anode compartments or vice versa. Cord electrodes are used as anode 18 and cathode 1. The solution conducted to the electrode compartments may be either the outlet stream from either concentration or dilution compartment, raw sea water or raw brackish water from another source without adjusting pH. FIG. 8 shows how a solution from an outside source is used as an electrode rinse solution and is conducted in parallel.

Figure 9:
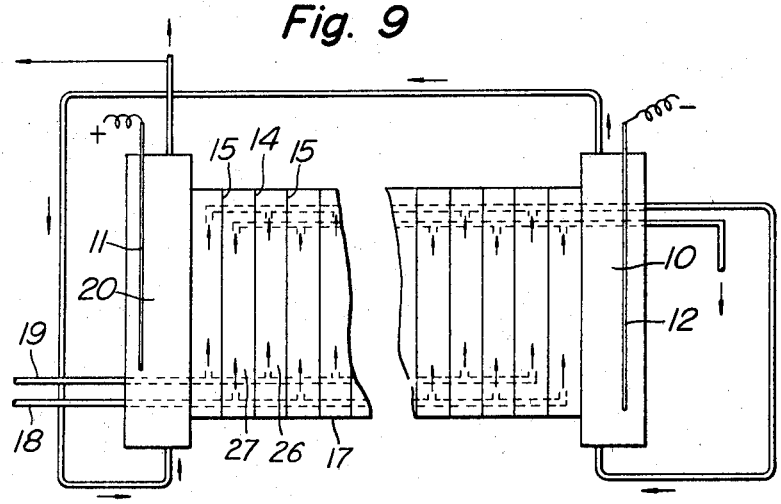

FIG. 9 illustrates the situation in which cord electrodes are used as both the anode and the cathode. A plurality of dilution compartments 27 and concentration compartments 26 are formed with spaced alternate cation exchange resin membranes 24 and anion exchange resin membranes 25 respectively therebetween with cation exchange resin membrane 24 as the diaphragm on the cathode side and anion exchange resin membrane 25 as the diaphragm on the anode side.

The anode compartment 30 and the anode compartment 8 are constructed as shown in FIG. 3. Dilution solution is supplied through inlet pipe 19 and concentration solution is supplied through inlet pipe 20 to each compartment 27 and 26 respectively in a stack 17. Concentration solution discharged from stack 17 through concentration compartments 26 directly flows into cathode compartments 8 and then directly to anode compartments 30 in series and is discharged after passing through the compartments. The outlet stream from cathode or anode compartment may be circulated from anode compartment 30 to cathode compartment 8 in series.

Figure 10:
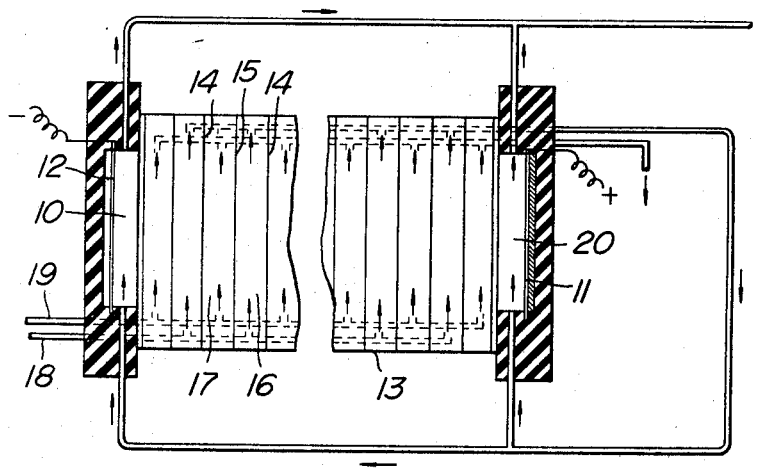

FIG. 10 is a schematic diagram illustrating an example in which a cord electrode such as shown in FIGS. 1 and 2 is the cathode 1 and a graphite electrode is the anode 18. All of the concentrating solution is used as electrode rinse solution. Stack 17 is made by alternately arranging a plurality of concentration compartment 26 and dilution compartments 27. Inlet solution for the concentration compartment is supplied through inlet pipe 20 and inlet solution for the dilution compartment is supplied through inlet pipe 19 into each compartment. The apparatus is so formed that the concentration stream which passed each concentration compartment 26 in stack 17, is divided into two portions, one portion passing through space area 30 of the anode compartment, the other portion passing through space area 10 of cathode compartment.

In an electrodialysis of a solution containing organic matter, a fouling of the membranes, an increase in the resistance, a prevention of solution-flow inside the concentration compartments resulting in lowering the efficiency of electrodialysis are likely to occur. It is known that the polarity reversal process is effective to overcome these problems.

In the usual electrodialysis apparatuses, the device of polarity reversal as described in U.S. Patent No. 2,863,813, accompanies the complication of apparatuses and handling, namely, the simultaneous interchanging of the electrode rinse solutions and of the acid feed piping to the cathode rinse solutions for pH adjustment. The polarity reversal can be carried out without any complicated operation by the electrodialysis apparatus of the present invention using a cord electrode. In the apparatus shown in FIGS. 7, 8, 9 and 10, the periodic or cyclic interchange of dilution stream and concentration stream alone is necessary to carry out the periodic or cyclic reversal of the direction of the direct current, without accompanying any other interchanging of electrode rinse solution or the adding of chemicals for pH adjustment to the electrode rinse solutions.

These features and merits of the instant invention will be appreciated by the following examples.

EXAMPLE 1

The example shows an experiment on obtaining magnesium hydroxide as a by-product from the concentration of sea water by means of electrodialysis apparatus of this invention. The unit included 250 anion membranes, 250 dilution compartments, 250 cation membranes, and 249 concentration compartments. The electrode was constructed as shown in FIG. 3, and included round stainless steel cords having a diameter of 1.5 mm. as the cathode and a graphite electrode as the anode, all arranged as shown in FIG. 6. The entire unit passed 400 amperes of direct current. Into the cathode compartment sea water of neutral pH was supplied at the flow rate of 20 liters a minute. Sea water with a 0.536 N chloride ion concentration was supplied to dilution compartment 27 at a flow rate of 600 liters a minute, and concentrated sea water with a 3.5 N chloride ion concentration was circulated in the concentration compartment at a rate of 84.4 liters a minute. Magnesium hydroxide was continuously obtained at the rate of 391 gr./hr. as a by-product of the electrodialysis in addition to concentrated sea water having a 3.5 chlorine ion concentration and diluted sea water having a 0.30 N chlorine ion concentration. Further, no accumulation of scale was found in the cathode compartment and cathode surface after 7 days of continuous operation.

EXAMPLE 2

An electrodialysis apparatus was prepared as shown in FIG. 3 comprising a stack consisting of 100 pairs of cation exchange resin membranes and anion exchange resin membranes forming 100 dilution compartments and 99 concentration compartments each of which had an effective electrodialysis area of 8.6 dm.$^2$ by using cathode and anode compartments as shown in FIG. 3 and including electrodes consisting of platinum plated titanium round cords with a diameter of 1 mm. Sea water of neutral pH with a concentration of 35,000 p.p.m. was circulated into the dilution compartment 27 at a flow rate of 100 liters a minute and into concentration compartment 26 at a flow rate of 15 liters a minute. When the outlet stream from the concentration compartment 26 was first supplied to the cathode compartment 8 and then the anode compartment 30 in series as shown in FIGURE 9 and when operated with a direct current of 30 amperes, sea water of 34,000 p.p.m. was continuously obtained from dilution compartment 27 at a current efficiency of 95%. A continuous run was made for 10 days under said conditions with no accumulation observed in cathode compartment 8 and anode compartment 30 and the electrodialysis was carried out smoothly.

EXAMPLE 3

The electrodialysis unit of Example 2, when continuously operated on the same solution as in Example 2 for 10 days under the same conditions as in the Example 2 by reversing the flow of the electrode solution, e.g., from anode compartment 30 to cathode compartments 8. No accumulation of the precipitates was found in cathode compartment and anode compartment.

EXAMPLE 4

The electrodialysis unit of Example 2, was operated on diluted sea water with a concentration of solute of 1100 p.p.m. supplied to the dilution compartments 27 at flow rate of 100 liters a minute and sea water of neutral pH was supplied to the concentration compartments 26 at flow rate of 15 liters a minute while the entire unit passed a direct of current of 6 amperes. The salinity of the diluted sea water was reduced from 1100 p.p.m. to 900 p.p.m. at a current efficiency of 90%. A continuous run was made for 10 days under these conditions and no accumulation was observed in cathode compartment 8 and anode compartment 30, and a smooth electrodialysis was followed.

EXAMPLE 5

An electrodialysis unit had 110 pairs of anion and cation permselective resin membranes defining 110 dilution compartments and 109 concentration compartments therebetween as shown in FIG. 10, each of which had an effective electrodialysis area of 8.6 dm.$^2$. The electrodes employee were as is shown in FIG. 2 and included round cords made of stainless steel having a diameter of 1 mm. as the cathode and a graphite electrode as the anode.

Into the dilution compartments, diluted sea water with a concentration of 1100 p p.m. was supplied at flow rate of 150 liters a minute and into the concentration compartments, neutral sea water was supplied at flow rate of 15 liters a minute. One liter a minute of the outlet solution from the concentration compartment was supplied to anode compartment and the remainder to cathode compartment. When the entire unit operated with a direct current of 6 amperes at a current efficiency of 90%, the salinity was reduced from 1100 p.p.m. to 950 p.p.m.

This electrodialysis unit was run for 10 days continuously and a smooth electrodialysis was obtained without accumulation of insoluble precipitate in cathode compartments.

On the other hand, when the apparatus constructed as mentioned above with a plate made of stainless steel as the cathode was operated with sea water as mentioned above, an accumulation of magnesium hydroxide in cathode compartment was observed after 3 hours of electrodialysis under the same condition as mentioned above, resulting in the decrease in current density and clogging of the solution. Thus the electrodialysis was completely impossible.

EXAMPLE 6

An electrodialysis unit constructed, as described in Example 2 but with 200 pairs of anion and cation permselective resin membranes, was provided with pipes which circulated a part of the outlet stream from the concentration compartments into electrode compartments as electrode solutions. Diluted sea water of 1100 p.p.m. was supplied to dilution compartment 17 at flow rate of 300 liters a minute, and sea-water of neutral pH to concentration compartment as a flow rate of 30 liter a minute in circulation, and 1 liter a minute of the outlet stream from the concentration compartment 26 was supplied to the anode compartment, 15 liters a minute to the cathode compartment and the remainder discarded. When the entire unit operated with a direct current of 6 amperes at a current efficiency of 90%, the salinity of the sea-water was reduced from 1100 p.p.m. to 980 p.p.m. The continuous electrodialysis under the condition as mentioned above for 10 days was smoothly carried out.

What is claimed is:

1. A multicell electrodialysis apparatus comprising a plurality of alternate cation permselective resin membranes and anion permselective resin membranes forming alternate concentration compartments and dilution compartments, an anode electrode compartment at one end of the apparatus and a cathode electrode compartment at the other end of the apparatus, a cord electrode fixed in at least one of said electrode compartments comprising a plurality of vertically extending cords of electroconductive material, connecting rods of electroconductive material fixedly attached to the upper ends and the lower ends of said cords to supply electric current to the cords and to provide mechanical rigidity for the electrode, and an electrode plug of electroconductive material attached to at least one of said connecting rods to supply electric current from an external current source to the connecting rods, an inlet for electrode rines solution at one of the ends of the electrode compartments and an outlet for electrode rinse solution at the other of the ends of the electrode compartments.

2. A multicell electrodialysis apparatus as claimed in claim 1, comprising supply and exhaust conduits disposed at the upper and lower parts of the dilution and concentration compartments for carrying diluting and concentrating solutions, the exhaust conduit from one of the groups of compartments passing solution upwardly through one electrode compartment from the lower end to the upper end and then passing solution upwardly through the other electrode compartment in series from the lower end to the upper end for supplying to said electrode compartments electrode rinse solution.

3. A multicell electrodialysis apparatus as claimed in claim 1, comprising supply and exhaust conduits disposed at the upper and lower parts of the dilution and concentration compartments for carrying diluting and concentrating solutions, the conduit from one of the group of compartments being divided into two conduits each of which passes solution upwardly through an electrode compartment in parallel from the lower end to the upper end to supply to said electrode compartment electrode rinse solution.

4. A multicell electrodialysis apparatus as claimed in claim 1 including a source of electrode rinse solution and a supply conduit for the electrode rinse solution, said supply conduit passing rinse solution to the inlet of one of the said electrode compartments and then passing solution through the other of said electrode compartments upwardly in series from the lower end to the upper end.

5. A multicell electrodialysis apparatus as claimed in claim 4, wherein said supply conduit for the electrode rinse solution is divided into two conduits each of which upwardly passes solution through the electrode compartments in parallel from the lower end to the upper end.

6. A multicell electrodialysis apparatus as claimed in claim 1, comprising supply and exhaust conduits disposed at the upper and lower parts of the dilution and concentration compartments for carrying diluting and concentrating solutions, the exhaust conduit from one of said groups of compartments passes solution upwardly through one electrode compartment from the lower end to the upper end and then passes solution upwardly through the other electrode compartment in series from the lower end to the upper end for supplying to the electrode compartments electrode solution to permit polarity reversal of said electrodes while exchanging flow of diluting solution and concentrating solution.

7. A multicell electrodialysis apparatus as claimed in claim 1, comprising supply and exhaust conduits disposed at the upper and lower parts of the dilution and concentration compartments for carrying diluting and concentrating solutions, the exhaust conduit from one of said groups of compartments being divided into two conduits each of which upwardly passes solution through an electrode compartment in parallel from the lower end to the upper end to permit polarity reversal of said electrodes while exchanging flow of diluting solution and concentrating solution.

8. A multicell electrodialysis apparatus as claimed in claim 1, including an external source of electrode rinse solution and a conduit for the electrode solution wherein said conduit passes solution upwardly through one electrode compartment from the lower end to the upper end and then passes solution upwardly through the other electrode compartment in series from the lower end to the upper end to permit polarity reversal of the electrodes while exchanging flow of diluting solution and concentrating solution.

9. A multicell electrodialysis apparatus as claimed in claim 8, wherein said conduit for the electrode solution is divided into two conduits each of which upwardly passes solution through the electrode compartments in parallel from the lower end to the upper end to permit polarity reversal of the electrodes while exchanging flow of diluting solution and concentrating solution.

References Cited
UNITED STATES PATENTS

| | | | |
|---|---|---|---|
| 3,135,674 | 6/1964 | Ruetschi | 204—301 |
| 3,192,143 | 6/1965 | Roe et al. | 204—301 |

JOHN H. MACK, *Primary Examiner.*

E. ZAGARELLA, *Assistant Examiner.*